C. DE PREE, A. LEENHOUTS & J. J. MERSEN.
FUMIGATING APPARATUS.
APPLICATION FILED MAY 16, 1907.
973,634.
Patented Oct. 25, 1910.
2 SHEETS—SHEET 1.
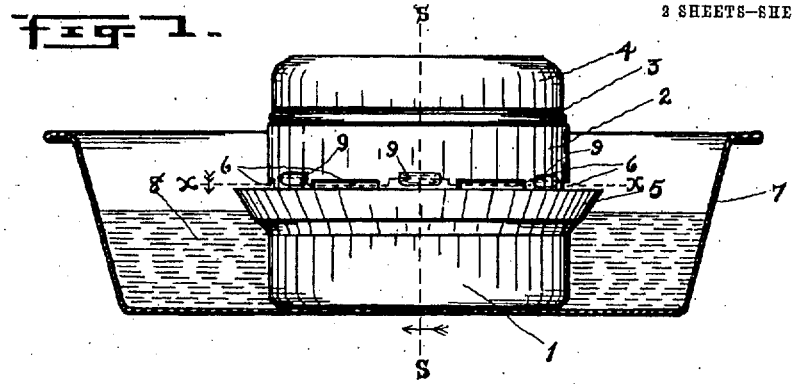
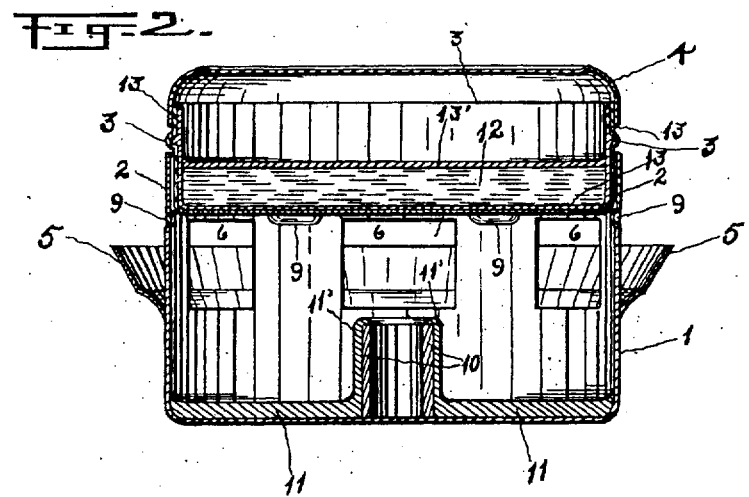
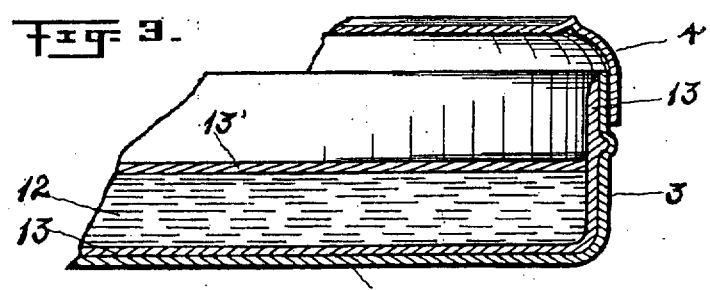
WITNESSES:
Charles W. Pake.
Mary S. Tooker.
INVENTORS
Cornelius De Pree
Abraham Leenhouts
John J. Mersen
BY Edward Taggart
ATTORNEY.

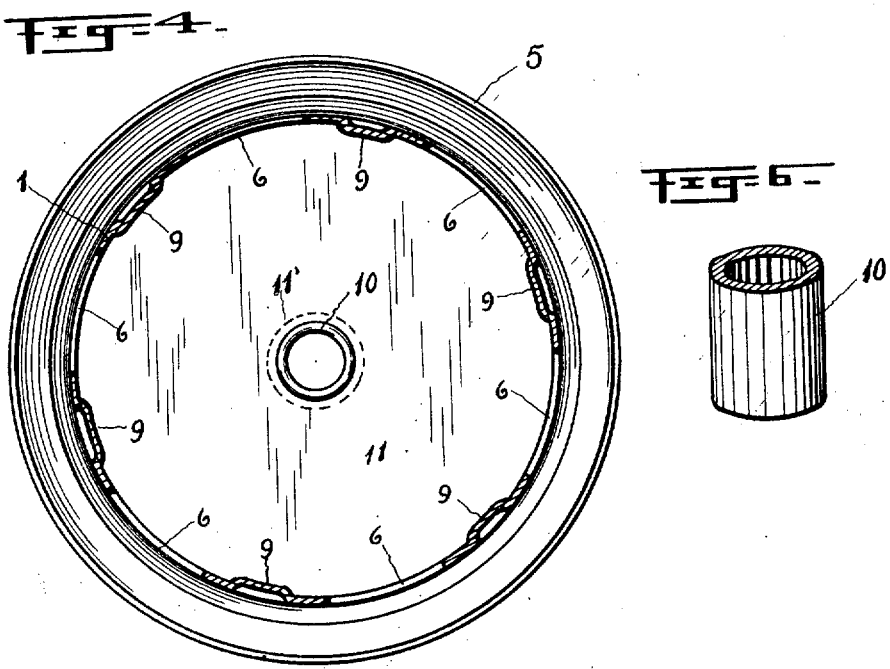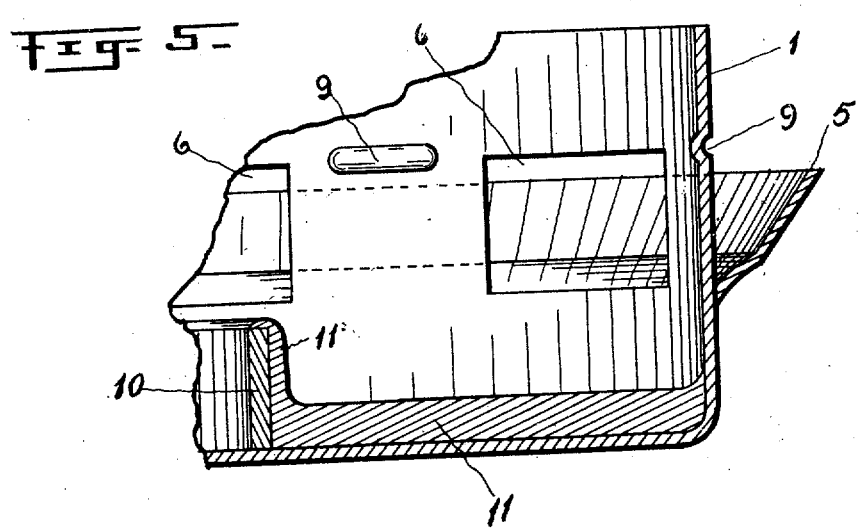

UNITED STATES PATENT OFFICE.

CORNELIUS DE PREE, ABRAHAM LEENHOUTS, AND JOHN J. MERSEN, OF HOLLAND, MICHIGAN.

FUMIGATING APPARATUS.

973,634.  Specification of Letters Patent.  Patented Oct. 25, 1910.

Application filed May 16, 1907. Serial No. 373,947.

*To all whom it may concern:*

Be it known that we, CORNELIUS DE PREE, ABRAHAM LEENHOUTS, and JOHN J. MERSEN, citizens of the United States, residing at Holland, in the county of Ottawa and State of Michigan, have invented new and useful Improvements in Fumigating Apparatus, of which the following is a specification.

This invention relates to new and useful improvements in fumigating apparatus.

The object of the invention is to provide in extremely simple, efficient and cheap form an apparatus for the production of formaldehyde gas, or other gases, for disinfecting or germicidal purposes.

The common, efficient method of fumigating by formaldehyde gas is to procure from places where it may be kept for sale ready prepared water suitably charged with this gas, and then vaporize the same in special apparatus prepared for that purpose, including a proper receptacle, alcohol lamp, and other parts. The procuring and handling of the water thus charged is difficult and expensive, usually requiring glass receptacles carefully sealed; and the usual efficient vaporizing apparatus is expensive and must remain for several hours in the room which is being fumigated. The duplication of such apparatus in large numbers so that many rooms could be treated at the same time would be impracticably expensive, and to treat only one room at a time is unsatisfactorily slow. These difficulties we avoid by providing an apparatus which can be sold at retail for a price so trifling that it can be used and thrown away, so that it is feasible to treat a large number of rooms at as nearly the same time as the successive preparation of the rooms and placing of the apparatus will permit.

Specifically, our objects are to provide an efficient organized structure of lamp and vaporizer and to provide and improved cartridge structure for formaldehyde disinfecting. This object we accomplish by the device shown in the accompanying drawings, in which:—

Figure 1 is a side elevation of the complete device, placed in a pan of water, the latter being shown in vertical cross section. Fig. 2 represents a vertical cross section of the device on line s—s of Fig. 1. Fig. 3 is an enlarged view of a portion of the upper part of the apparatus shown in Fig. 2. Fig. 4 is a top plan view on the line x—x of Fig. 1. Fig. 5 is an enlarged view of a portion of the lower part of the apparatus shown in Fig. 2. Fig. 6 is a detail of the wick.

The entire metal part of the device is constructed preferably of very light tin, or some similar metal which can be easily struck up into the required shape.

1 is the main lower chamber of the device corresponding to the lamp body, or fuel reservoir, of a vaporizing lamp. This body or bowl is developed upward by the continuous vertical wall 2 extending above the openings 6 and the inwardly struck projections 9, and permitting the upper receptacle or container to be inserted and held closely by this upper end of the bowl portion and to be supported by projections 9 against inserting too far, thus accurately spacing and adjusting the upper receptacle.

3 is a receptacle which we call a container, made of size corresponding to the lamp bowl, and so that it will fit into the open top of the latter and form a closure therefor. This container has near its upper edge the annular bead or rib illustrated in Figs. 1, 2 and 3, and is closely covered at the top by the cap 4 adapted to fit accurately over the container and to rest upon the bead in the same.

5 is a flange flaring upwardly and outwardly, as shown, and rigidly and continuously attached at its lower edge to the body 1. It operates as hereinafter described.

6—6 are rectangular openings through the side of the body 1 adapted to admit air to support combustion, and to permit the escape of the products of combustion. There may be as many of these, and they may be of such size and shape, as the proper aiding of combustion and the proper maintenance of the lamp flame require.

7 represents a pan or basin, and 8 the body of water contained therein.

9—9 are inward projections from the body 2 and forming a support for the upper container 3 accurately spacing the same as above described. We have shown them in the form of separate depressions from the exterior instead of in the form of a continuous rib or bead.

10 is the wick constructed of asbestos, or other similar non-combustible rigid substance.

11 is the body of fuel designed to be burned through the medium of the wick, and covering the bottom of the lamp bowl. This fuel body extends up the side of the wick, as shown by the extension 11'.

12 represents the body of the substance to be vaporized, held in the container 3. 13 is an insulating coating between such container and such contained body, and 13' is a coating for the upper portion of the body of the contained substance.

The lamp part of our improved structure can, of course, be made use of to evaporate any suitable deodorizing or disinfecting material, but is especially adapted for developing the gases from our container and contents, above described, which is, in reality, a cartridge especially formed for the development and distribution of gaseous formaldehyde, developing the same from the paraformaldehyde contained therein. We desire to comment also that the cartridge can be made use of in connection with any proper heating means without using our special lamp. We have, however, especially adapted the one to the other, so that, when the devices are placed in a dish of water, the lamp is designed to last just long enough to gasify the formaldehyde of the charge, and, owing to the relation and proportion of parts, the flame is maintained at just the right elevation to insure proper heating and to avoid overheating and to drive out all of the gas that is contained in the cartridge charge.

This structure enables us to greatly economize in the use of fuel and the charge of paraffin for fuel varies but a very few grains in the different devices which we put out, it being our purpose to allow two or three grains extra of the material to insure its complete operation.

This device is intended to be used either for merely deodorizing purposes or for germicidal purposes, and is generally adapted to use substances which may be vaporized or converted into gaseous form. Some features of it are especially adapted for the production of formaldehyde gas.

Any device of this character must be left unattended in a close room for several hours. It develops considerable heat, and it is customary, as a precaution, to set the same in a pan or dish of water. Unless especial care is used, the water may accidentally pass through the openings 6—6' and extinguish the flame. To prevent this accident is the purpose of our guard flange 5. It projects outwardly only to a sufficient height, and it is removed from the body a sufficient distance, so as to not interfere with the entrance of air to the interior nor with the exit of the products of combustion. At the same time, it absolutely prevents the water from entering these openings, and it is so proportioned that, if desired, it will float the entire device in the water body. For example, in Fig. 1, if a slightly additional quantity of water was added, the device would float before any water would pass over the edge of the guard flange 5. In this way also injury or damage of fire from excessive heat upon the bottom may be avoided.

The commercial utility of a device of this character depends largely upon carrying the body to be vaporized in solid form, and the efficient vaporizing of such body in solid, or approximately solid, form within the time for which such a device can be kept burning requires a high degree of heat difficult to produce in a structure so simple and cheap that it can be economically thrown away. To produce the result requires a very accurate and exact determination of the proper thickness and character of metal; air and combustion openings, quantity and arrangement of fuel, and more especially of the distance from the flame to the bottom of the container. Obviously the burning away of an ordinary wick, thus increasing this distance, would destroy the operation, and we cannot resort to the ordinary lamp means of adjusting the wick, because the device must work automatically. Obviously, also, any ordinary flat wick of fibrous material, as soon as it becomes heated, and therefore soft, would fall down; even if of round form and if of a height two or more times its diameter, it would also collapse under heat if it was sufficiently soft and fibrous properly to carry the fuel. We have found by very careful experiment that an asbestos wick of round form and of a height not more than twice its diameter will efficiently convey the oil or other material and will work without collapsing under heat and without danger of being turned over by any ordinary jar, and will thus maintain throughout the operation and with certainty the proper space distance between the flame and the bottom of the container. The wick should be of rigid material. We find also that for efficient operation the flame produced by this wick should be opposite the openings 6—6, and the top of the wick should therefore be slightly below the bottoms of these openings, and that the top of the wick should be approximately one-half the distance between the bottom of the lamp bowl and the bottom of the container, and that this peculiar form and location and extent of wick will produce a proper amount and not too much flame.

The device would operate with any suitable fuel, as oil or paraffin for the fuel body 11—11', but for commercial utility, and, in order to operate as planned, we must use something which will solidify at ordinary temperatures, as does paraffin. This solidification, also, is necessary in order to maintain the wick in its erect position, because the wick is not in any other manner attached to the lamp body or held in position. It is evident that if such fuel like paraffin is poured into the device when liquid and the wick is coated therewith, it will, as it cools and solidifies, hold the wick in position, and then later, when a match is applied, melting enough at the top of the wick so that it will ignite, the heat of the flame will continue to melt the solidified fuel and it will be carried in the usual way to the point of combustion. At the same time, as above explained, the non-combustible wick, on account of its peculiar size and proportions, will maintain its erect position, and will not fall over into the fuel, setting fire to it generally, or otherwise interfere with the normal operation. This coöperation between the predetermined length and position of the wick and the predetermined position of the bottom of the container fixed by the supporting retainers 9, insures the perfect and continuous vaporization of the contents of the container.

We design to use formaldehyde gas in what may be untechnically called solid form. It may be produced in this so-called solid form in various methods, but the preparation commercially known as paraformaldehyde may be taken as an example and may be used in this device as one of the so-called solid forms of formaldehyde. When, however, heat is applied to paraformaldehyde, the tendency is to dissipate it in the air in the form of minute particles rather than as a true gas, and the presence of moisture in connection with the paraformaldehyde is important for efficient vaporization or gasifying, if, indeed, a true gas may be produced at all from this particular form of solid formaldehyde. We, therefore, provide a moistening agent, as oil, for our solid formaldehyde, and in the drawing we represent this body of paraformaldehyde, or other solid formaldehyde, mingled with the moistening agent, by the numeral 12. We find that an oil suitable for such moistening agency is to be had by taking one part of glycerin and one-half part of paraffin, and of this mixture we use a quantity equal to not less than one nor more than five per cent. of the solid formaldehyde with which it is admixed. This composition will not keep for any length of time without deterioration or injury if in contact with tin or similar metal. We, therefore, line or coat the interior of our container 3 with a coat of paraffin, or oil, preferring a material that will solidify when cold. This coating is represented by the number 13. We also cover the top of composition 12 with a coating 13' of paraffin or similar substance, preferring, as explained, one which will be solid when cold. This coating 13' serves a double purpose. It acts as a seal, preventing the evaporation of the oil or other moisture contained in the composition 12, therefore, maintaining the composition in proper condition for efficient vaporization, while, at the same time, it, under the operation of heat, automatically unseals the composition and permits the vapors or gases formed to escape up through it. It also operates to prevent the boiling or overflow of the composition, and this is exceedingly important. When sufficient heat is applied to cause vaporization, or produce gas, any such composition tends to boil over. This not only prevents proper vaporization, but the formaldehyde is inflammable, and it is liable, upon such boiling over, to take fire and be consumed, thus making the fumigation inefficient even if the fire does no other harm. We find that this coating of paraffin or similar substance on the surface of the composition, when melted, prevents such boiling over both by acting as oil does upon water and by measurably combining with the composition and modifying its action under heat and thus permits the process of vaporization or gasification to be continued to its completion in a steady and reliable way.

In this specification, we have used the expression "paraffin" relating both to the fuel and also to the envelop or covering for the formaldehyde preparation in the vaporizing receptacle. We wish to say that we use that expression in a general sense, to not only embrace paraffin, but equivalent substances.

The removable cover 4 also protects from evaporation or drying out the contents of the container, and is easily slipped off when the device is to be used.

The entire construction is such that the device can be manufactured and sold for a trifling price, and can be economically purchased in large numbers by boards of health and others who do large amounts of fumigating and can be used then thrown away, all at much less cost than is involved in using a permanent vaporizing apparatus. We find by actual use that the described means of providing moisture for and retaining moisture in the formaldehyde composition preserves it in perfect form for ready use and under all ordinary commercial conditions.

Having thus described our invention, what we claim to have invented, and desire to secure by Letters Patent, is—

1. As an article of manufacture, a prepared fumigating device consisting of, in combination, a lamp bowl having an imperforate bottom and openings for the circulation of air to the flame, a reservoir having an imperforate bottom carried by the lamp bowl and adapted to contain the material to be vaporized, a non-combustible wick carried immediately by the bottom of the lamp bowl and standing thereon, and a fusible combustible body of paraffin also carried immediately by the lamp bowl and by which alone the wick is held in erect position within the lamp.

2. As an article of manufacture, a prepared fumigating device consisting of, in combination, a lamp bowl having an imperforate bottom and having openings for the circulation of air to the flame, a reservoir having an imperforate bottom carried by the lamp bowl and adapted to contain the material to be vaporized, a non-combustible wick carried immediately by the bottom of the lamp bowl and standing thereon, and a solid fusible combustible body of paraffin also carried immediately by the lamp bowl and by which alone the wick is held in erect position within the lamp, which solid oil body is continued in a thin sheet along the sides of the wick upwardly extending from the main portion thereof.

3. As an article of manufacture, a prepared fumigating device consisting of, in combination, a lamp bowl having an imperforate bottom and having openings for the circulation of air to the flame, a reservoir having an imperforate bottom carried by the lamp bowl and adapted to contain the material to be vaporized, a hollow self supporting non-combustible wick carried immediately by the bottom of the lamp bowl and standing thereon and a solid fusible combustible body of paraffin also carried immediately by the lamp bowl and by which alone the wick is held in erect position within the lamp, which solid body is continued in a thin sheet along the sides of the wick upwardly extending from the main portion thereof, whereby as the surrounding solid fuel body is consumed the wick remains self-supporting.

4. As an article of manufacture, a prepared fumigating device consisting of, in combination, a lamp bowl having an imperforate bottom and having openings for the circulation of air to the flame, a reservoir having an imperforate bottom carried by the lamp bowl and adapted to contain the material to be vaporized, a wick carried by such lamp bowl, a solid fusible combustible body of paraffin carried by the lamp bowl and surrounding the wick and an upwardly and outwardly flaring guard flange springing from the lamp bowl at a point below the openings in such bowl and extending to a point above the same.

5. As an article of manufacture, a prepared fumigating device consisting of, in combination, a lamp bowl having an imperforate bottom and having openings therein for the circulation of air to the flame, a self-supporting, non-combustible wick resting upon the bottom of such lamp bowl, a solid fusible combustible body of paraffin contained in such bowl and surrounding and securing said wick in position, and a reservoir carried by and above such lamp bowl and containing a formaldehyde body and a moistening agent incorporated therewith.

6. As an article of manufacture, a prepared fumigating device consisting of, in combination, a lamp bowl having an imperforate bottom and having openings therein for the circulation of air to the flame, a self-supporting, non-combustible wick resting upon the bottom of such lamp bowl, a solid fusible combustible body of paraffin contained in such bowl and surrounding and securing such wick in position, and a reservoir carried by and above such lamp bowl and containing a solid formaldehyde body and a moistening agent incorporated therewith and carrying also a solid paraffin covering sealing such formaldehyde body.

7. As an article of manufacture, a prepared fumigating device consisting of, in combination, a solid formaldehyde body, an intermixed moistening agent, a close fitting container therefor having sides extending above such formaldehyde body, and air sealing paraffin coating upon the upper surface of such formaldehyde body and carried by and held within such container, means for supporting such container, and means for applying heat to the under surface thereof whereby the contents may be vaporized.

8. As an article of manufacture, a prepared fumigating device consisting of a metallic container, a solid paraffin covering upon the interior surface thereof, a solid formaldehyde body carried within such container and kept by such solid paraffin covering from contact with the metal thereof, a solid paraffin and air-sealing coating resting upon and carried by the formaldehyde body and uniting with the interior coating of the container completely to surround and protect the solid formaldehyde body, means for supporting such container, and means for applying heat to the under surface thereof and thereby vaporizing the contents.

9. As an article of manufacture, a prepared fumigating device consisting of a water receptacle, a lamp receptacle with closed bottom and sides with draft openings to admit air to support combustion, an incombustible wick arranged in said lamp bowl, a solid fusible paraffin fuel in the bottom of said lamp bowl and supporting the said incombustible wick, a receptacle supported above said lamp with imperforate sides and bottom, a solid formaldehyde vaporizable material incased in a layer of paraffin within the said receptacle, and a suitable detachable cover for the said receptacle.

10. As an article of manufacture, a prepared fumigating device consisting of a lamp receptacle with closed bottom and sides with draft openings to admit air to support combustion, an incombustible wick arranged in said lamp bowl, a solid fusible paraffin fuel in the bottom of said lamp bowl and supporting the said incombustible wick, a receptacle supported above said lamp with imperforate sides and bottom, a solid formaldehyde vaporizable material incased in a layer of paraffin within the said receptacle, and a suitable detachable cover for the said receptacle.

11. As an article of manufacture, a prepared fumigating device consisting of a lamp receptacle with closed bottom and sides with draft openings to admit air to support combustion, a self supporting wick in said lamp bowl, a solid fusible fuel surrounding the said wick in the said lamp bowl, a receptacle suitably supported above said lamp with imperforate sides and bottom, a formaldehyde vaporizable material, suitably supported in said receptacle, and a layer of paraffin surrounding the said vaporizable material in said receptacle.

12. As an article of manufacture, a prepared fumigating device consisting of a lamp receptacle with closed bottom and sides with draft openings to admit air to support combustion, a self supporting wick in said lamp bowl, a solid fusible fuel surrounding the said wick in the said lamp bowl, a receptacle suitably supported above said lamp with imperforate sides and bottom, and a formaldehyde vaporizable material in a suitable moistening medium, suitably supported in said receptacle.

13. As an article of manufacture, a prepared fumigating device consisting of a lamp receptacle with closed bottom and sides with draft openings to admit air to support combustion, a self supporting wick in said lamp bowl, a solid fusible fuel surrounding the said wick in the said lamp bowl, a receptacle suitably supported above said lamp with imperforate sides and bottom, and a formaldehyde vaporizable material suitably supported in said receptacle.

14. In a fumigating device, a suitable vaporizing receptacle, a lamp receptacle arranged beneath said vaporizing receptacle, a self supporting incombustible annular wick arranged in the said receptacle, and a fusible fuel surrounding the said wick, coacting with said fuel in the said receptacle.

15. In a fumigating device, a suitable vaporizing receptacle, a lamp receptacle arranged beneath said vaporizing receptacle, a self supporting incombustible wick in said receptacle, and a suitable solid fusible fuel surrounding the said wick in the said receptacle.

16. In a fumigating device, the combination with suitable heating means, of a receptacle for the fumigating material, a solid formaldehyde material admixed with a suitable moistening agent, and a coating of paraffin lining the said receptacle and incasing the said formaldehyde material, coacting for the purpose specified.

17. In a fumigating device, the combination with suitable heating means, of a receptacle for the fumigating material, a solid formaldehyde material, and a coating of paraffin lining the said receptacle and incasing the said formaldehyde material, coacting for the purpose specified.

18. In a fumigating device, a lamp consisting of a proper receptacle, an annular self supporting asbestos wick arranged within the said receptacle and a fusible paraffin fuel in the said lamp surrounding and supporting the said wick, and a vaporizing receptacle suitably supported above said lamp.

19. In a fumigating device, a lamp consisting of a proper receptacle, a self supporting asbestos wick arranged within the said receptacle, and a fusible paraffin fuel in the said lamp surrounding and supporting the said wick, and a vaporizing receptacle suitably supported above said lamp.

20. In a fumigating device, a cartridge consisting of an exterior metallic shell with an imperforate bottom, a paraffin lining for the same, a charge of paraformaldehyde admixed with a moistening agent, and a layer of paraffin over the said charge hermetically sealing the same whereby on the application of heat to the outer casing the paraffin fuses forming an oily layer over the charge and regulating the evaporation of the same and insuring its gasification and preventing boiling over and ignition.

21. In a fumigating device, a cartridge consisting of an exterior metallic shell with an imperforate bottom, a paraffin lining for the same, a charge of paraformaldehyde, and a layer of paraffin over the said charge hermetically sealing the same whereby on the application of heat to the outer casing the paraffin fuses forming an oily layer over the charge and regulating the evaporation of the same and insuring its gasification and preventing boiling over and ignition.

In testimony whereof we have hereunto set our hands in presence of two subscribing witnesses.

CORNELIUS DE PREE.
ABRAHAM LEENHOUTS.
JOHN J. MERSEN.

Witnesses:
H. J. SNIDENS,
WM. J. WESTVEER.